MATRIX SWITCHING OF SOURCES AND CONTROL

Filed Oct. 18, 1965 2 Sheets-Sheet 1

INVENTORS
ROBERT H. TANNER
RONAN M. CAMBRIDGE
MORRIS M. BERESFORD

BY Westell & Hanley

INVENTORS
ROBERT H. TANNER
RONAN M. CAMBRIDGE
MORRIS M. BERESFORD

BY Westell & Hanley

United States Patent Office 3,470,533
Patented Sept. 30, 1969

3,470,533

MATRIX SWITCHING OF SOURCES AND CONTROL

Robert H. Tanner, Ottawa, Ontario, and Ronan M. Cambridge and Morris M. Beresford, Belleville, Ontario, Canada, assignors to Northern Electric Company Limited, Montreal, Quebec, Canada Filed Oct. 18, 1965, Ser. No. 497,160
Int. Cl. H04q 3/42
U.S. Cl. 340—166 10 Claims

ABSTRACT OF THE DISCLOSURE

A plurality of program or signal sources and a plurality of transmission devices may be connected in selectable pairs. Circuitry provides that, with such connection, there is also provided a connection between a control actuator, associated with the connected source and a control associated with the connected transmission device, such control being actuable by the actuator to control a characteristic of the signal received from the source at the transmission device.

This application relates to means for connecting a plurality of sources to a lesser plurality of transmission devices, and controlling signals emanating from said sources at such transmission devices. The principal advantages of the invention accrue where the transmission devices are located at a central location and the control actuators for exercising said control are at physically remote locations.

By the term "source" we mean the device from which an electrical signal carried by wire, usually containing information, is supplied. The information may be for audio, video, coded information or other communications purpose.

By central location, we mean a location which is "electrically central" and is adapted to receive at transmission devices such signals from the sources. By "transmission device" is meant a device with an input to receive such signal and an output from which it is sent to another destination. It is contemplated that such signal will be amplified, attenuated or otherwise controlled between input and output. Such central location will, to make full use of the advantages of the invention, have a number of transmission devices with corresponding controls less than the number of sources. Such transmission devices will have terminals for connection to the sources, and to control actuators. The design of the transmission device and accompanying control will be in accord with many designs available to those skilled in the art, and will be such that electrical control signals from the control actuator, received at the transmission device controls, control the source originating signals received at the transmission device.

The transmission device control may thus, if desired, be remotely controlled by an electrical signal from the control actuator remotely located, such control signal being therefore used to control some characteristic of the signal from whatever source is connected to the transmission device. Although the system will in many places be discussed in relation to audio program sources for radio or TV broadcasting with the central location being an audio equipment rack having a plurality of transmission devices; it will be realized that in other fields than audio programming the sources and central locations will be replaced by sources and central locations of other types without departing from the principles of the invention.

Present systems which have a number of transmission devices equal to the number of sources have under many operating conditions, a surplus of transmission devices and controls therefor, since under most operating conditions, only a lesser number of such sources will be operating simultaneously and hence only such lesser number of such transmission devices and controls therefor will be required. Where the number of transmission devices and controls therefore are equal to the number of sources, therefore, the expense and size of the equipment is usually unduly large because of unnecessary equipment. Where it is desirable that the control actuators be remotely controlled, it will usually be considerably more expensive than a corresponding locally controlled device, in which case the cost saving is all the more significant.

On the other hand, present systems, wherein a lesser number of transmission devices are provided at the central location than there are sources, require complex and involved switching arrangements which increase chances of operating errors particularly where there is an attempt to provide transmission control actuators for the controls of the devices operable from another location. Further, the prior systems with such complex switching have been difficult to automate, and to program for automation.

It is an object of this invention to provide means and a method whereby the plurality of sources may be connected as required, to the source terminals of a lesser plurality of transmission devices, in such a manner, that sources may be connected to and disconnected from transmission devices as required, so that a maximum number of sources may be connected, up to the number of transmission devices available, and wherein remote electrical transmission of the signal from the source at the transmission device may be achieved by electrically connecting a control actuator located remotely, with the control of the transmission device, by the same switching system which achieves connection of the source to the transmission device. The control actuators may conveniently be grouped in a console, or alternatively may be located near the corresponding sources. As a third alternative, two or more such control actuators may be provided for any source, only one of which would normally be used at one time.

In accord with the invention therefore, each source need not have an individual transmission device but the number of transmission devices need only correspond to a lesser number equal to the number of sources which may be used simultaneously. Such transmission devices may be located at the central console for remote control by an electrical signal, from a control actuator or control actuators remotely located.

It is an object of the invention to utilize matrix switching to connect individual sources selected from a plurality of sources having associated control actuators with individual transmission devices selected from a lower plurality of transmission devices, said transmission devices being adapted to be operated at their control terminals by electrical signals from said control actuators.

When the system of the invention is used, the central equipment may be made smaller since a fewer number of transmission devices are required than program sources. The switching system is simplified and operating errors are reduced since at the remote control location (or elsewhere) there may always be provided a control actuator uniquely associated with each source.

The present invention overcomes the disadvantages of existing systems and reduces the number of electronic facilities associated with the console, amplifiers and the like; and a reduction of the necessary transmission devices. The invention provides a simple control system associated with each transmission device and operable remotely from a control actuator (at the source or elsewhere). The present invention reduces to the minimum the facilities of the equipment required by the program traffic of the operation.

The invention provides transmission devices at the central location which may be remotely varied such that all associated circuitry may be located outside of the operating area, except for any actual manually operated controls.

The invention provides central equipment which may be readily automated.

In drawings which illustrate the preferred embodiment of the invention:

Figure 1:
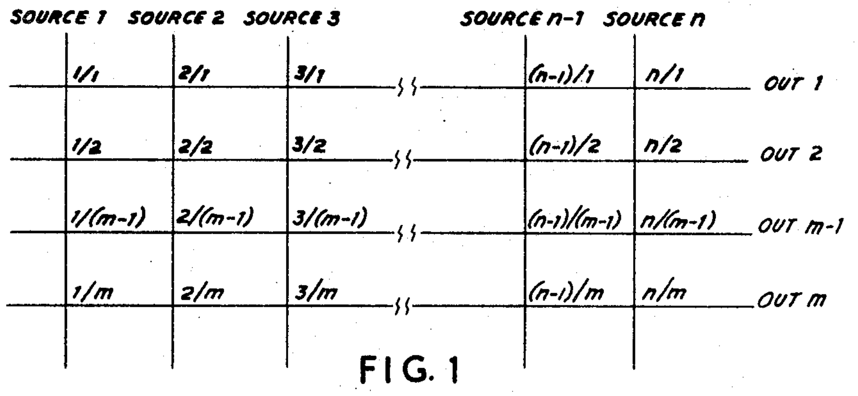
FIGURE 1 is a schematic diagram illustrating the logic for the connection of individual sources from a plurality of sources to individual source terminals of a lesser plurality of transmission devices.

In FIGURE 1 is shown the switching philosophy, in accord with the invention, for connecting a larger plurality of sources (say $n$) to a smaller plurality of source terminals of transmission devices (say $m$) and the switching philosophy is as follows:

(a) Only one source may be connected to any transmission device source terminal.

(b) Only one transmission device source terminal may be connected to any source.

(c) The first source selected shall be connected to the source terminal of transmission device 1, the second source selected to the source terminal of transmission device 2 until the $m$th source selected is connected to transmission device $m$. Thereafter no further sources may be connected until one of the connections, already made, is relinquished.

A sample sequence of connections in accord with FIGURE 1 might be as listed below:

| | Source selected | Transmission device to which source terminal source is connected | Via crosspoint |
|---|---|---|---|
| Order of occurrence: | | | |
| 1st | 2 | 1 | 2-1 |
| 2nd | 1 | 2 | 1-2 |
| 3rd | 3 | 3 | 3-3 |
| mth | n | m | n-m |
| (m+1)th | n-1 | [1] | None |
| 6th | Source 3 to source terminal of transmission device 3 released | | |
| 7th | n-1 | 3 | (n-1)-3 |

[1] No connection.

Figure 2:
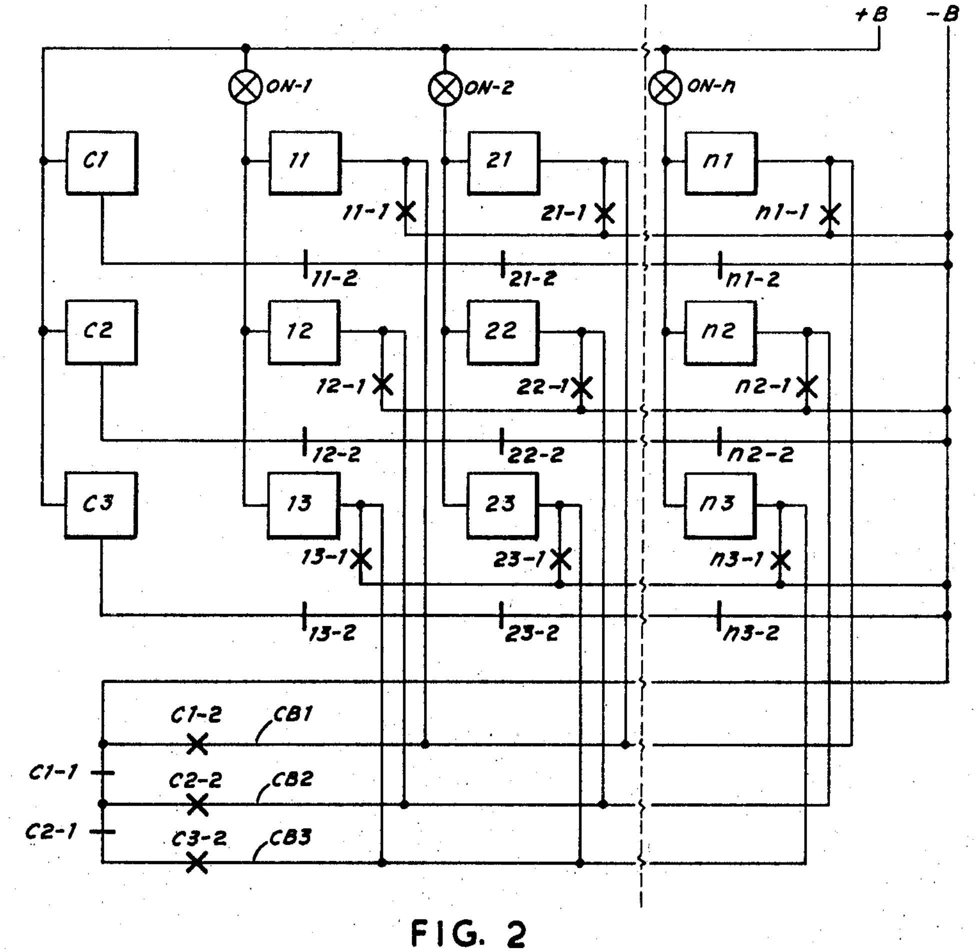
FIGURE 2 is a drawing illustrating the operation of one possible matrix switching system for connecting any three (individually) of $n$ sources to the 3 source terminals of respective transmission devices.

FIGURE 2 shows a possible control schematic diagram for relay switching system for connecting $n$ sources with 3 transmission device source terminals and meeting the requirements of FIGURE 1. Relays are used for switching. However, other switching elements such as transistors or diodes could be used.

In FIGURE 2 is shown a positive source B+ for connection to one side of "on" switches (ON–1, ON–2, up to ON-$n$). It should be realized that such switches connect the B+ source to lines each corresponding to the individual sources and since the function of the various sources is similar, only the first two and the "$n$th" are shown. It might also be noted that 3 control buses CB1, CB2 and CB3 are shown, and that the invention is operable with any number of these, however, many of the advantages of the invention accrue when the number of control buses (which will correspond to the number of transmission devices) is less than the number of sources. By the term "bus" in the attached specification we mean an electrical conductor to which a number of electrical connections may be alternatively or contemporaneously made. In other words although it would be possible to use switching circuitry in accord with the invention where the number of transmission devices corresponds to the number of sources, it would be in most cases, more useful in such situation to directly connect sources and transmission devices rather than to use switching in accord with the invention.

Returning to the circuitry of FIGURE 2, the side of switch ON–1 remote from the B+ source is connected to one side of relays 11, 12 and 13 respectively corresponding to the 3 transmission devices; similarly the side of switch ON–2, remote from the B+ source, is connected to one side of relays 21, 22 and 23 and so on, with the switch ON–$n$ similarly connected. Three control buses CB1, CB2 and CB3 corresponding to the three transmission devices are provided and each relay corresponding to the first transmission device is connected directly to the CB1 bus, each relay corresponding to the second transmission device is connected to the CB2 bus and so on. Each relay is also connectable to ground through its own normally open –1 contacts.

A relay C1 is connected to the B+ potential datum and to the B– potential datum through normally closed –2 contacts corresponding to each relay (11, 21 and so on in the sequence to $n$1) which is connected to the CB1 control bus. Similarly a relay C2 is connected from B+ to B– through normally closed –2 contacts corresponding to each of the relays connected to bus CB2 and similarly a relay C3 is connected from B+ to B– through normally closed –2 contacts corresponding to each of the relays connected to bus CB3.

The buses are or may be considered as arranged in order of precedence with the first CB1 connected to the B– source through the normally open contacts C1–2 of relay C1. Control bus CB2 is connected to B– through the normally open contacts C2–2 of relay C2 and the normally closed contacts of the relays corresponding to buses of higher precedence, that is (in this case) the normally closed contacts C1–1 of relay C1. Similarly bus CB3 is connected to B– through the normally open contacts C3–2 of the relay C3 and the normally closed contacts (C1–1 and C2–1) corresponding to each relay corresponding to a bus of higher precedence. It will be seen that this process of adding sources with corresponding buses and relay connections may be continued with $m$ control buses each such control bus being connected to B– through normally open –2 contacts corresponding to its own "C" relay and normally closed –1 contacts corresponding to each relay of higher precedence.

Figure 3:
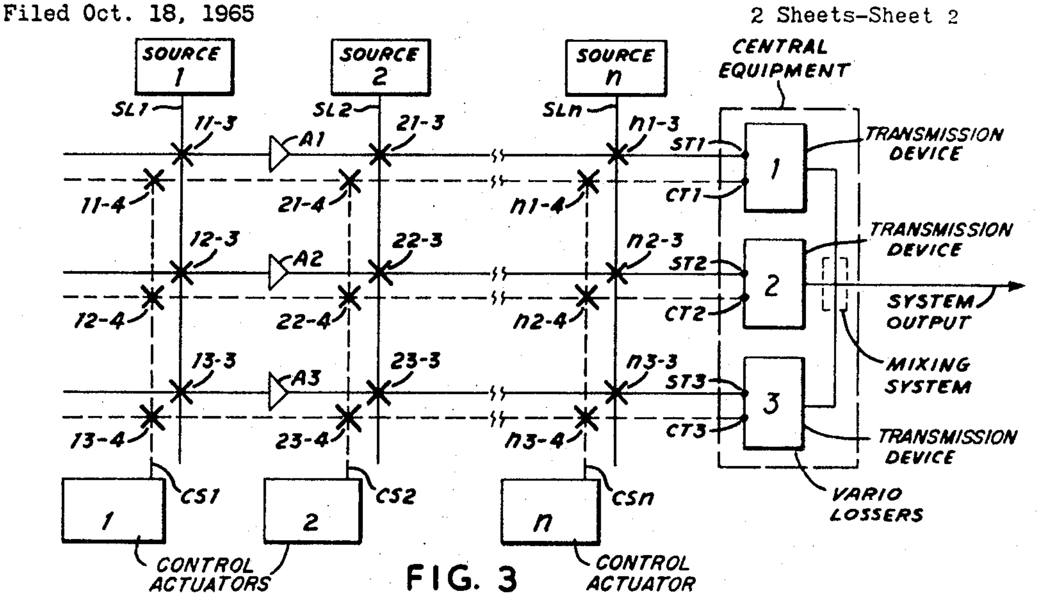
FIGURE 3 shows the sources and control actuators which are switched by the matrix switching system of FIGURE 2.

In FIGURE 3 is shown the system operated by the matrix control system of FIGURE 2, in which $n$ sources are shown each having a corresponding control.

Three transmission devices are provided for use contemporaneously by any three of the sources. Each transmission device has a source terminal for connection to a source and a control terminal of a control for connection to a control actuator. Thus transmission device 1 is provided with source terminal ST1 and its control with a control terminal CT1. The transmission device in accord with the many varieties of designs available, is designed so that the electrical signal received at the "CT" control terminal will control some characteristic of the signal received at the ST source terminal. A source line SL1 extends from source 1, SL2 from source 2, with similar source lines from other sources up to and including line SL$n$ from source $n$. Corresponding to each source is a control signal line, respectively designated CS1, CS2 . . . CS$n$. Source line SL1 is connectable to the transmission device source terminals ST1, ST2 and ST3 respectively by the normally open contacts 11–3, 12–3, 13–3 respectively of relays 11, 12 and 13 respectively, similarly source 2 is connectable to the transmission device source terminals ST1, ST2 and ST3 respectively by the normally open contacts 21–3, 22–3 and 23–3 respectively of relays 21, 22 and 23 respectively, and so on, so that each source may be connected to each transmission device by the normally open –3 contact of the relay which at one end is connected to B+ datum through the ON switch corresponding to the source and at its other end is connectable to B– datum through the bus corresponding to the transmission device. The control actuator corresponding to source 1 is connectable to control terminals CT1, CT2, and CT3 of the three transmission devices by the normally open contacts 11–4, 12–4, 13–4 of relays 11, 12, 13 respectively, corresponding to source 1. The control actuator corresponding to source 2 is similarly connectable to control terminals CT1, CT2 and CT3 by the normally open contacts 21–4, 22–4 and 23–4 and corresponding connections for control actuators corresponding to higher numbered sources, are provided. In each case, therefore, the relay which connects a source to the source terminal of a transmission device will connect the control actuator to a corresponding control terminal of the same transmission device.

If it is desired to use sources, where different sources may have different output levels and there are two or more of such levels, amplifiers may be included in the lines feeding the transmission devices, as for example A1, A2 and A3 connected between the normally open contacts 11–3 and 21–3, between the normally open contacts 12–3 and 22–3, and between the normally open contacts 13–3 and 23–3.

In the specific embodiment shown, it is assumed that source 1 is at a lower level hence having signals requiring greater amplification than signals originating with the remaining sources. The transmission device lines are respectively connected to the control devices 1, 2 and 3 and, for example only, are shown as vario-lossers of the type described in Canadian Patent 687,882 issued June 2, 1964.

Although this is no part of the present invention the outputs from the transmission devices (i.e., in the specific invention shown, the vario lossers) may, if desired, be fed to a mixing system and hence to one or more signal outputs. It is of course equally within the scope of the invention if the outputs from the vario-losser or other device are separately handled.

Figure 4:
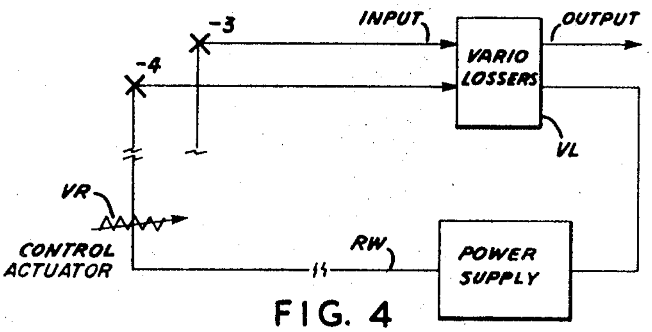
FIGURES 4 and 5 show examples of remotely located control actuators which may be used in accord with the invention.
Figure 5:
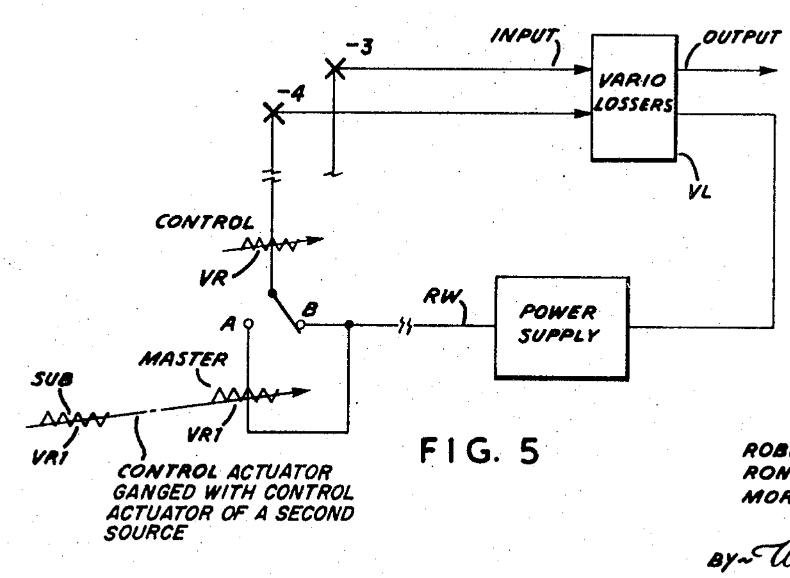

As will be noted, from the aforesaid Canadian patent, vario-lossers are a type of gain control for audio inputs which provide for variation of gain by control of a variable resistor VR (or VR and VR1) in FIGURES 4 or 5. An increase of current in such a device tends to provide a reduced gain. If the contact sequence of the switching system is arranged so that the source-source terminal switching takes place before the control actuator is connected to the control terminal, then the control current will be zero and the attenuation of the vario-losser control device will be maximum during the time of the source-source terminal switching. By this means switching transients are attenuated by the maximum attenuation of the transmission device before reaching the output terminals of the system. In FIGURES 4 and 5 are shown schematic drawings of the power supply for a vario-losser VL. In accord with the invention, the vario-lossers and power supply would be located at the equipment location and one would correspond with each transmission device, while the resistance or resistances would correspond to each source, and be located, for example, in a remote control console. Thus with each switching connection between a source and a transmission device, a relay contact –4 will connect a VR resistance or resistances to a vario-losser VL to produce the circuit of FIGURE 4 or the circuit of FIGURE 5. It will be noted that control circuits shown in dotted form in FIGURE 3 may represent double wires as indicated in FIGURES 4 and 5 or the second wire may be eliminated by connecting the second wire terminals at both source and transmission device end to ground.

In FIGURE 4, is shown a simple control actuator comprising a variable resistor VR, for a remote location whereby by operation of the resistance the gain of the vario-losser VL is varied and thus control of the program leaving the vario-losser is effected. The "break" in the wiring indicates the distinction between elements located at the equipment location and at a remote point while the contacts –4 indicate the possible connection between them. In accord with the invention, variation of the control will vary the gain between the input and output of the vario-losser, and it will be realized in relation to FIGURE 3, that such control taking place by adjustment of the variable resistor VR at the source will control the gain of the input to the vario-losser.

In FIGURE 5 is shown a similarly operating vario-losser wherein the single variable resistor VR at the source is combined with a variable resistor VR1 which may by the operation of the switch A–B, be put in series with VR. In accord with one of the alternatives, when using the invention, one of these resistors VR may be individually controlled in accord with characteristics of the source while the other of these variable resistors (VR1 in the drawing) may be ganged with similar variable resistors of other remote controlled sources, so that a number of these may be controlled simultaneously. This means of operation is often referred to as "sub-master" control.

The operation of the invention, as shown in FIGURE 2, will now be described: Before any selection or before any source is ready for use, all cross-point relays 11 to ***n*3** are de-energized. The C relays C1, C2, C3, are energized as the normally closed –2 contacts of the cross-point relays are closed allowing the negative power supply to be connected to the C relays.

Since relay C1 is energized, the control bus CB1 is connected to the negative side of the power supply through contacts C1–2 but the CB2 and succeeding control buses lower in precedence are not so connected since contacts C1–1 are then open.

When an "ON" switch (say ON–1) is actuated, indicating the selection of source 1 for connection to a transmission device, all the cross-point relays connected to this "ON" switch relays 11, 12, 13, are connected to the positive side of the power supply B+. Only the relay 11 connected to the control bus CB1 is returned to the negative side B– of the power supply, hence it only is energized. The consequent energization of relay 11 closes the –3 and –4 contacts, respectively connecting the source 1 to source terminal ST1 at vario-losser 1 and control 1 to the control terminal CT1 of vario-losser 1.

The sequence of operation of contacts 11–3 and 11–4 (and indeed of all –3 and –4 contacts operating in analogous situations) can be arranged so that the source is connected to the source terminal before the control actuator is connected to the control terminal, and the controls are disconnected before source and source terminal are disconnected. In this way maximum attenuation may be obtained when the sources are switched, and hence any transients which may occur before switching are attenuated by the full attenuation of the vario-losser before being applied to the source terminal, thus the necessary quality of the switching system that is, freedom from transients, can be greatly improved.

It will be realized that alternatively, if desired, the control connection at the –4 contacts may be made before or simultaneously with the source-source terminal connection at the –3 contacts, if this mode of operation will assist in the particular design of the system.

Returning to the operation of the system; at the time of energization of relay 11, the energization of this relay closes contacts 11–1 connecting the relay directly to B– thus bypassing the connection through the control bus to B– and locking the relay 11 in energized position for the duration of the time the switch "ON–1" is closed.

Immediately thereafter (as achieved by the design operating time of the relay contacts), contacts 11–2 are opened, de-energizing relay C1 and disconnecting the bus CB1 but closing contacts C1–1 and connecting the negative supply B— through previously closed contacts C2–2 to bus CB2.

Thus the later energization of another "ON" switch cannot cause energization of any relay connected to the highest precedence bus CB1 since contacts C1–2 are open and will remain so as long as contacts 11–2 are open, preventing the energization of relay C1. On the other hand, since contacts C1–1 are closed the second control bus is connected to B— datum, since contacts C2–2 are closed (all the –2 contacts in the line from B— to relay C2 are closed at this time). On the other hand the third control bus is disconnected from B datum at this time since with relay C2 energized, the bus CB3 is disconnected from the negative datum B— at contacts C2–1. Thus on energization of a second "ON" switch, say ON–*n* indicating the selection of source *n* for connection to a control device, only relay *n*2 is energized since this is the only relay connected to switch ON–*n* and the CB2 bus. Energization of this relay: connects source *n* to source terminal ST2 over contacts *n*2–3; the corresponding control facility of source *n* to control terminal CT2; over contacts *n*2–4; locks in relay *n*2 over contacts *n*2–1, and then opens contacts *n*2–2 to de-energize relay C2 and disconnect control bus CB2 from B— datum. At the same time, de-energization of relay C2 allows contacts C2–1 to close, contacts C3–2 being already closed (since all the –2 contacts in the line from B— to relay C3 are normally closed) and hence the next switch which will be energized will energize the corresponding relay connected to bus CB3 to connect the corresponding source to source terminal ST3; and the control actuator to the corresponding control terminal CT3.

If during the connection of a source to the third source terminal ST3, the "*n*" source is to be disconnected, ON switch *n* is opened de-energizing relay *n*2 then contacts *n*2–2 close to re-energize relay C2. This closes contacts C2–2 and the CB2 bus is ready to energize the connected cross-point relay corresponding to the next ON switch energized, and contacts C2–1 are opened but this does not interfere with the operation of the source originally connected through the operation of the CB3 bus since the cross-point relay connected to this bus is not de-energized thereby, since it will now be locked in by its –1 contacts independent of such bus.

If the control actuator is a simple variable resistor as indicated in FIGURE 4 then operation of such variable resistor which is remotely located, will operate the control located at the control equipment and control the gain of the terminal vario-losser receiving program from source 1 and hence control the program connected with source 1.

In accord with the invention, and as previously described, the number of transmission devices may be kept as low as the number which will be simultaneously in use and can therefore be less than the number of sources. Further, the size of the console may be reduced since the number of transmission devices need only correspond to the number of sources to be simultaneously in use rather than to the total number of sources.

Further because of the operation of the matrix switching system of FIGURE 2 the device may be easily automated and lends itself to this.

If it is desired to control signals or programs originating with a number of sources simultanously, then these will be provided with series variable resistances as indicated in FIGURE 5, wherein a first control resistance VR is adapted to individually vary the gain of the transmission device to which the source is connected and on operation of the switch, a second control resistance VR1 may be operated to control the gain of the vario-losser together with others of the same type and thus what is known as "sub-master" control may be achieved with the device.

It will be realized that the invention is not limited to audio or video programming; to the use of vario-lossers; nor is it limited to control of gain. The system of the invention may be used in any situation where a number of sources of signals, programs, messages or the like, are electrically selectively connectable to transmission devices at a central location and some characteristic of the signal program, message or the like may be varied or controlled and wherein the command to perform such control may be transmitted electrically from source locations to the central location. The control command may be electrically achieved by a change of resistance, impedance, phase or frequency or any other means by which the information for the command may be electrically carried to a control terminal of the transmission device.

It will be also noted that circuitry may be provided if desired with a light or lights connected to indicate how many free transmission device source terminals are still available for connection by further sources.

While only one control connection is shown to be switched under the same conditions as a corresponding source it will be realized that if there are return leads from a control such as the vario-losser to the control actuator that these will be switched at the same time and in addition the switching of a source-source terminal connection may be accompanied by the switching of as many further independent controls as desired, it being realized that the only requirement to achieve this is a multiplication of the numbers of contacts on the cross-point relay.

In the drawing, it will be realized that if a plurality of low level sources and a plurality of high level sources are operated by the same switching then the low level sources may be arranged on one side of their matrix electrically remote from the higher level so that in the input connections the former may be separated from the latter by amplifiers, as indicated in relation to the first source in FIGURE 3.

The number of amplifiers will therefore be the same as the number of transmission device source terminals and it is an advantage of the invention that this can be considerably less than the number of low level sources. Since the noise of the switching on the source may be muted during switching (by controlling the order of switching of source-source terminal connections relative to control connections) low level switching is quite practical.

We claim:

1. A plurality of sources;

a plurality of transmission devices each having a source terminal, electric signal responsive control means corresponding to each of said transmission devices for controlling signals from a source received at the source terminal of such a control device;

means corresponding to each source for supplying such an electrical control signal;

actuable means corresponding to each combination of a source and a transmission device for connecting such source and such transmission device and the corresponding electrical signal supplying means to the corresponding electrical signal responsive means;

first means corresponding to each source adapted to assume one state when a source is selected for connection to a transmission device and another state when a source is unselected for such connection;

second means corresponding to each source terminal designed and constructed to assume one state when the corresponding transmission device is unconnected to a source and to assume another state when the corresponding transmission device is connected to a source;

means actuable by a said first and a said second means being contemporaneously in said one state, for operating the said actuable means corresponding to the combination of the respective corresponding source and transmission devices.

2. A device as claimed in claim 1 wherein said second means are arranged and connected so that where a plurality of transmission devices corresponding to said second means are unconnected to a source only one second means at a time may assume said one state.

3. Circuitry for connecting any one of a plurality of sources to any one of a plurality of transmission devices,
wherein each said transmission device is provided with a source terminal for connection of the source thereto,
wherein each said transmission device is provided with a control associated therewith for controlling a characteristic of signals received at the source terminal associated with said transmission device,
wherein each control is provided with a control terminal and each control is responsive to an electrical signal at said control terminal to control said characteristic,
wherein a control actuator is associated with each said source, said control actuator being designed to provide an electrical signal for operation of a control comprising:
a source control line corresponding to each source,
a bus corresponding to each source terminal,
means for connecting a source control line to a bus,
means for preventing the contemporaneous connection of a source control line to a second bus or the contemporaneous connection of a bus to a second source control line,
means responsive to the connection of a source control line to a bus for connection:
(a) the source and source terminal, corresponding, respectively, to the connected source control line and bus,
(b) the control actuator and control, corresponding, respectively, to the last-mentioned source and last-mentioned source terminal.

4. Circuitry for connecting any one of a plurality of sources to any one of a plurality of transmission devices,
wherein each said transmission device is provided with a source terminal for connection of the source thereto,
wherein each said transmission device is provided with a control associated therewith, for controlling a characteristic of signals received at the source terminal associated with said transmission device;
wherein each control is provided with a control terminal, and each control is responsive to an electrical signal at the associated control terminal to control said characteristic;
wherein a control actuator is associated with each said source; said control actuator being designed to provide an electrical signal for operation of a control; comprising:
a source control line corresponding to each source;
a bus corresponding to each source terminal;
means for connecting a source control line to a bus;
means actuable to prevent the connection of a second source control line to a previously connected bus, while the source terminal corresponding to said bus is connected to a source; and means actuable to prevent the connection of a second bus to a previously connected source control line while the source corresponding to said source control line is connected to a source terminal.

5. Circuitry for connecting any one of a plurality of sources to any one of a plurality of transmission devices,
wherein each said transmission device is provided with a source terminal for connection of the source thereto,
wherein each said transmission device is provided with a control associated therewith, for controlling a characteristic of signals received at the source terminal associated with said transmission device;
wherein each control is provided with a control terminal; and each control is responsive to an electrical signal at the associated control terminal to control said characteristic,
wherein a control actuator is associated with each said source; said control actuator being designed to provide an electrical signal for operation of a control, comprising:
a source control line corresponding to each source;
a bus corresponding to each source terminal;
means for connecting a source control to a bus which bus is unconnected to any other source control line and which bus corresponds to a source terminal then unconnected to a source;
means actuable to prevent the connection of a second source control line to a previously connected bus, while the source terminal corresponding to said bus is connected to a source; and means actuable to prevent the connection of a second bus to a previously connected source control line while the source corresponding to said source control line is connected to a source terminal.

6. Circuitry as claimed in claims 3, 4 or 5 including means connecting said buses in a predetermined order of priority and wherein said means for connecting a source control line is connected to connect such source control line to the highest priority bus whose corresponding source terminal is unconnected to a source.

7. Circuitry as claimed in claims 3, 4 and 5 wherein means are provided for individually varying the electrical signal of at least two of said control actuators, and means are provided for simultaneous control of at least two control actuators whose signal is also variable by said individual means.

8. Circuitry for connecting any one of a plurality of sources to any one of a plurality of transmission devices,
wherein each said transmission device is provided with a source terminal for connection of the source thereto,
wherein each said transmission device is provided with a control associated therewith for controlling a characteristic of signals received at the source terminal associated with said transmission device;
wherein each control is provided with a control terminal, and each control is responsive to an electrical signal at said associated control terminal to control said characteristic,
wherein a control actuator is associated with each such source, said control actuator being designed to provide an electrical signal for operation of a control,
comprising:
a source control line corresponding to each source connectable to a first potential datum connectable to a first potential datum through a switch;
a bus corresponding to each source terminal, said buses being arranged in a predetermined order of precedence,
each bus being connectable to a second potential datum through a first contact arranged to be open and closed when its corresponding source terminal is connected and unconnected, respectively to a source;
the connection of a bus to said second datum through said last-mentioned contacts also including, in series with said last-mentioned contacts, a set of second contacts corresponding to each bus of higher precedence,
each set of second contacts being connected and designed to be closed and opened when the source terminal for the bus to which they correspond is respectively connected to and disconnected from, a source;
an actuating means corresponding to each combination of a source control line with a bus, responsive to contemporaneous connection of said respective source control line and bus to their respective datums to provide a control signal;

means responsive to said control signal to connect the source, corresponding to said last-mentioned source control line, to the transmission device, corresponding to said bus, and to connect the control actuator associated with said last-mentioned source to the control terminal associated with said last-mentioned transmission device.

9. A device as claimed in claim 8 wherein means are provided responsive to the connection of a source control line to a bus to maintain said source connected to said source terminal, and said control actuator to said control terminal in spite of the later disconnection of said corresponding bus from said second datum.

10. A device as claimed in claim 9 in combination with means responsive to disconnection of a conducting source control line from said first datum to disconnect the corresponding source and control actuator from their connected transmission device and control, respectively.

References Cited

UNITED STATES PATENTS

| | | | |
|---|---|---|---|
| 2,846,513 | 8/1958 | Van Mierlo et al. | |
| 2,871,303 | 1/1959 | Da Riva | 179—39 |
| 3,205,307 | 9/1965 | Schmitthenner | 179—39 XR |
| 3,268,866 | 8/1966 | Van't Slot et al. | 340—147 |
| 3,288,939 | 11/1966 | Spellnes. | |

DONALD J. YUSKO, Primary Examiner

U.S. Cl. X.R.

179—1